Dec. 20, 1949     P. A. STURTEVANT     2,491,531

TORQUE APPLIER

Filed Jan. 11, 1949            4 Sheets-Sheet 1

Inventor.
Paul A. Sturtevant.
By Harold Olsen
Attorney.

Dec. 20, 1949 P. A. STURTEVANT 2,491,531
TORQUE APPLIER
Filed Jan. 11, 1949 4 Sheets-Sheet 2
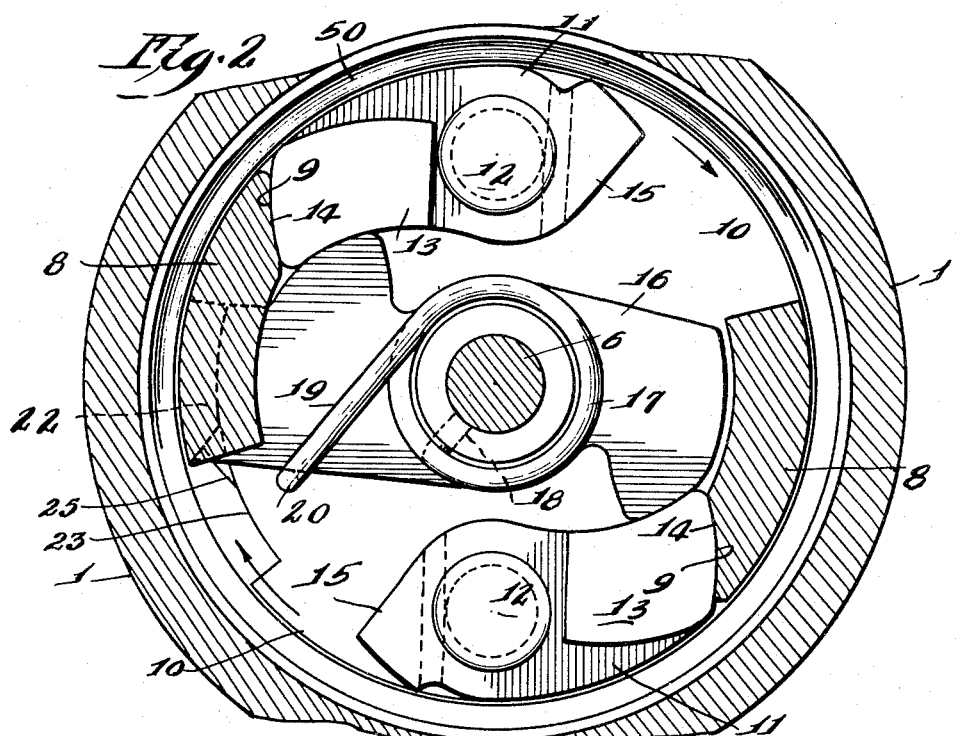
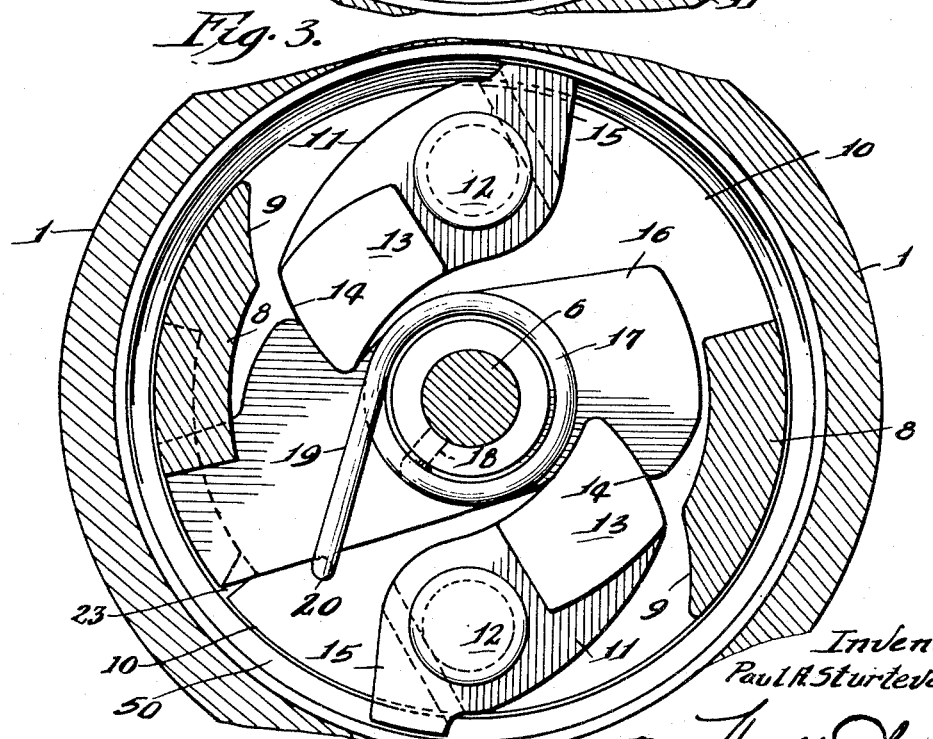
Inventor:
Paul A. Sturtevant
By Harold Olsen
Attorney.

Dec. 20, 1949 — P. A. STURTEVANT — 2,491,531
TORQUE APPLIER
Filed Jan. 11, 1949 — 4 Sheets-Sheet 4

Inventor:
Paul A. Sturtevant
By Harold Olsen
Attorney.

Patented Dec. 20, 1949

2,491,531

UNITED STATES PATENT OFFICE 2,491,531

TORQUE APPLIER

Paul A. Sturtevant, Elmhurst, Ill.

Application January 11, 1949, Serial No. 70,203

19 Claims. (Cl. 192—56)

In the application of torque for the many and varied purposes of industry, it has long been sought to provide a mechanism in which the delivery of power may be interrupted instantly when an accurately predetermined amount or degree of torque has been reached.

Generally speaking, the efforts to achieve the foregoing objective have lead to the invention, and patenting, of numerous torque applying mechanisms embodying automatically releasable clutches designed to be responsive to a predetermined load condition. Such devices, however, have not been satisfactory because, in general, it has not been possible accurately to predetermine and fix the point at which power delivery will be interrupted, and because in such devices the driving connection has been disrupted under full load resulting in severe and rapid wear of the contacting surface of the driving members and the necessity for frequent replacement thereof. Furthermore, the resulting pounding action eliminates entirely the possibility of any accurate torque measurement or response thereto.

In explaining my invention so that the construction of the mechanism and its operation may be made clear to those skilled in the art, I have selected for illustration the application of my invention to a power unit useful for the setting of threaded fasteners such as bolts, nuts, and the like. There are many such devices available upon the market and numerous other forms of such devices have been patented. In general, they do not satisfactorily perform their intended function for reasons which I shall now attempt to make clear.

When setting threaded fasteners, it is in most instances necessary that they be set to a predetermined tension, neither too loose nor too tight. If too loose, the fasteners will obviously not serve their intended purpose; if too tight, stresses will be set up in the fasteners and associated parts with consequent deleterious results when the fastened parts are subjected to stress and strain.

It is particularly important when a plurality of fasteners are set in a single member, as for example, the bolts by which a cylinder head is secured to the engine block, that all of the fasteners be set to the same degree of tension. Otherwise, because the structure is subjected to stresses and strains due to expansion and contraction upon temperature changes and due to vibration in operation, there may be, and often is, such distortion of the structure as to destroy prematurely its usefulness.

The forms of torque wrenches for setting threaded fasteners that are known to me all include certain features in common. In general, they include some form of clutch, either friction or interlocking jaw type, held in engaged position by means of a spring which is supposed to be responsive to excessive resistance at the work so as to open the clutch and interrupt the application of power. It has been attempted to make such springs adjustable so that the opening of the clutch would take place when the fastener has been set to a predetermined degree of tightness.

Friction clutches are not generally useful for this purpose because of excessive wear and because disengagement is a gradual process and cannot be completed at any predetermined point. Consequently, jaw clutches are commonly used. In these, when the resistance is sufficiently great to open the clutch, the clutch teeth rub against each other with great frictional force, with the result that the clutch teeth soon wear out and the clutch must be replaced. This results from the fact that the clutch releases under full load and it is the power of the full load that causes the clutch teeth to ride up and clear one another.

To predetermine accurately the degree of torque at which the application of power will instantly cease requires the elimination to the greatest possible degree of any friction in the mechanism. It is because of the excessive friction present in the prior art devices known to me that they have not been effective from the standpoint of accuracy nor successful from the standpoint of strength and longevity.

It is therefore an object of my invention to provide a torque applier in which the delivery of power may be instantly interrupted when a very accurately predetermined resistance is offered at the work.

A further object of my invention is to provide a torque applier having power transmission means easily disengageable by relatively light pressure as distinguished from the full load release devices of the prior art.

A further object of my invention is to provide a torque applier which includes an auxiliary force-transmitting means which will operate under a very accurately predetermined condition to effect release of the drive mechanism.

Another object of my invention is to provide a torque applier having force-transmitting means with an auxiliary force-transmitting means operable by a fraction of the available force to cause disengagement of the driving mechanism.

Still another object of the invention is to provide a torque applier in which the power transmission mechanism is interrupted with the least possible degree of friction.

A further object of the invention is to provide a torque applier in which release of power delivery may be effected by an easily adjustable mechanism which may be set for operation at a very accurately predeterminable degree of torque.

It will be understood that my invention herein disclosed is particularly applicable to the type of torque appliers which include a rotatable spindle or torque shaft as distinguished from the beam type.

So far as the source of power is concerned, it will be clear when my explanation has been completed that such source may be an electric motor, a fluid motor (whether hydraulic or pneumatic), or that the device may be operated manually.

In the accompanying drawings I have illustrated a practical embodiment of my invention. These drawings are illustrative merely and it is not my intention to limit my invention to the details of construction shown, except as such limitations are embodied in the appended claims. To those skilled in the art, it will be readily apparent that the invention is susceptible of embodiment in other forms without sacrificing its advantages or departing from the underlying principles thereof.

In the drawings,

Fig. 2 is a sectional view taken substantially on line 2—2 of Fig. 1 showing, principally in plan, the driving elements in contact;

Fig. 3 is a view similar to Fig. 2 but showing the driving elements disengaged;

Figure 1:
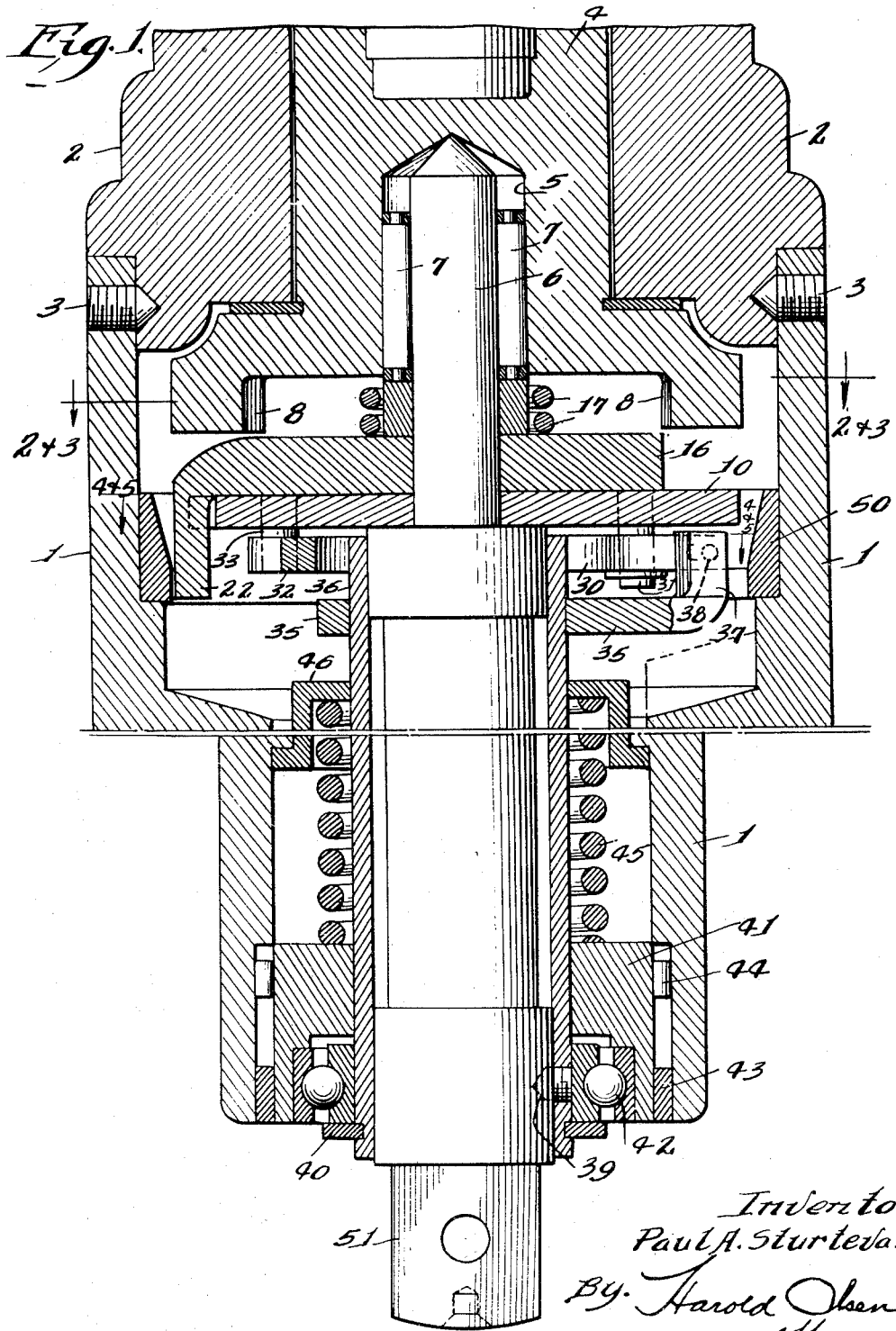
Fig. 1 is a view in longitudinal section of so much of a torque applier as I deem it necessary to illustrate in order to make my invention clear.

Referring now to the drawings, my device comprises a casing 1 and a cap 2 locked together by suitable fastening elements 3 located at any desired number of points around their respective meeting peripheries. The casing 1 and its cap 2 provide a chamber in which are located the essential parts of the mechanism.

At the upper end of the casing and housed within the cap 2 is a drive member 4, hollow in its central part as at 5, to form a housing for the upper end of a resistance responsive member or torque shaft 6. A suitable bearing 7 surrounds the upper end of the shaft 6 and is located within the housing 5. Said bearing may be any desired needle bearing or roller bearing.

The lower periphery of the drive member 4 is provided with a pair of drive lugs or teeth 8 located on opposite sides of a diameter of the drive member. Each of these drive lugs or teeth 8 has an engaging face 9 shaped substantially as shown in Figs. 2 and 3, for a purpose presently to be disclosed.

While I have shown the drive member as provided with two drive lugs or teeth 8, it will be understood that I do not limit myself to that particular number. However, because I provide two drive pawls, presently to be described, only two drive lugs are necessary on the member 4.

To establish a driving connection between the drive member 4 and the spindle or torque shaft 6, I provide drive lugs or teeth connected to said shaft 6 and adapted for engagement by the lugs or teeth 8 on the member 4.

This is accomplished by providing a drive plate 10 suitably secured to the torque shaft 6. Upon this drive plate 10 I have pivotally mounted a pair of drive pawls 11, the pivots 12 thereof being located at diametrically opposite points on the drive plate 10 and symmetrically placed with respect to the drive lugs 8 on the member 4.

Each of the drive pawls 11 has a drive lug or tooth 13 having an engaging surface 14 shaped to conform to the surface 9 of the drive lugs 8 and substantially of the configuration shown in Figs. 2 and 3.

Each of said pawls 11 is also provided with a tail piece 15 located on the opposite side of the pivot 12 from the lug 13, for a purpose presently to be described.

From the description thus far given, it will be understood that when the lugs 8 and 13 are in contact, as shown in Fig. 2, rotative force applied to the driving member 4 will cause rotation of the plate 10 and through the latter to the torque shaft 6. As shown in Fig. 2, the direction of rotation is clockwise, as when driving the usual threaded fastener. Of course, when driving fastening elements with a left hand thread, the cooperating drive lugs will be so arranged that the direction of rotation will be counterclockwise.

My device includes means for holding the drive pawls 11 with their lugs 13 in operative relation to the lugs 8 on the driving member 4, said means being operable to hold said pawls in inoperative position when the resistance of the work breaks driving engagement, in the manner presently to be described. Said means comprises a holding member or retainer 16 rotatably mounted on the torque shaft 6 above the plate 10 but resting lightly thereon so as to move with only light wiping contact on said plate.

Said member 16, as shown in Figs. 2 and 3, is substantially S-shaped with its diametrically opposite ends bearing against the drive pawls 11 to hold the same radially outwardly with their lugs 13 in engagement with the lugs 8 on the drive member 4.

The member 16 is provided with a spring 17 which surrounds the torque shaft 6 and has one end secured to said shaft as at 18. The other end 19 of said spring extends across the top of the member 16 and is bent over as at 20 to bear against the edge thereof.

Figure 4:
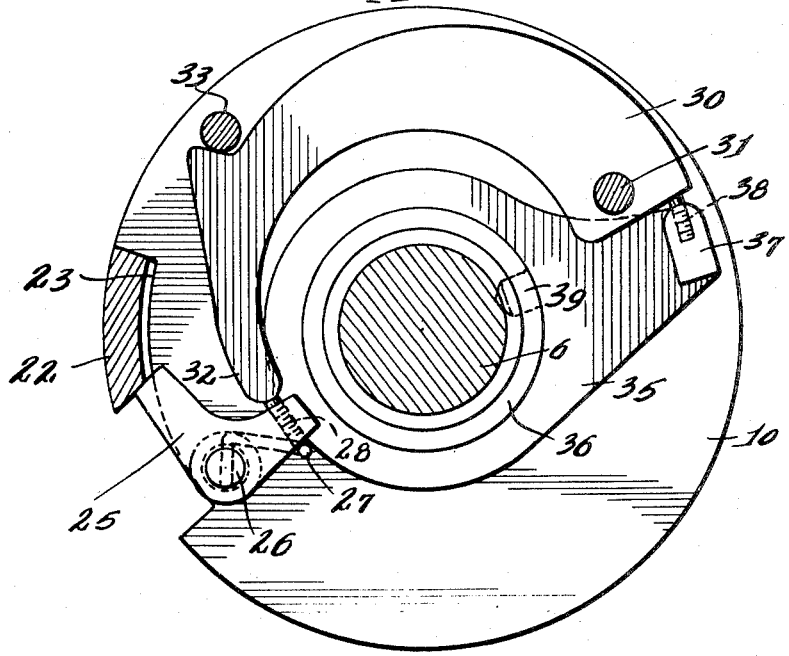
Fig. 4 is a sectional view taken substantially on line 4—4 of Fig. 1 showing, principally in plan, the torque responsive releasing mechanism when the driving elements are engaged as shown in Fig. 2.
Figure 5:
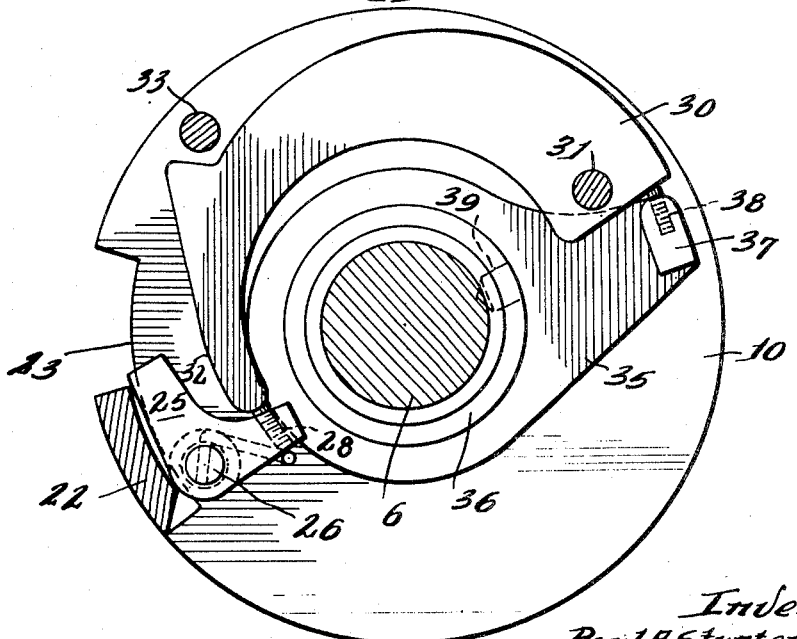
Fig. 5 is a view similar to Fig. 4 showing the position of the torque responsive release mechanism when the driving elements are disengaged as shown in Fig. 3.
Figure 6:
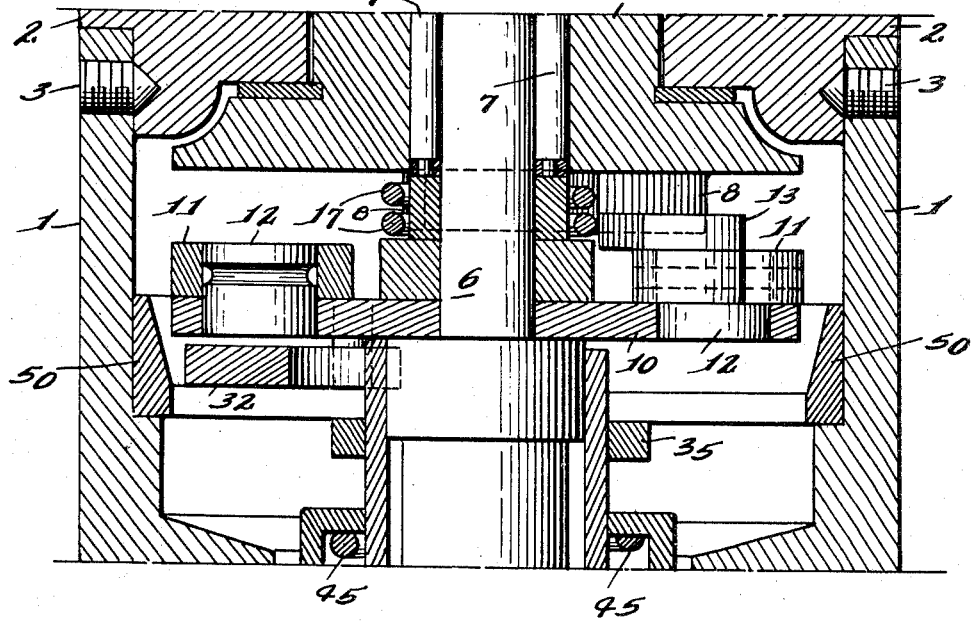
Fig. 6 is a fragmentary longitudinal section of the drive mechanism substantially like Fig. 1, but at an angle of substantially 90° from Fig. 1.

The retainer 16 has a depending operating arm 22 so located as to move in an arcuate notch 23 cut out of the periphery of the drive plate 10. Movement of the retainer 16 from the position of Fig. 2 to that of Fig. 3 is effected by the mechanism now to be described:

Figs. 4 and 5 are plan views of the control mechanism for the member 16. In said views the arcuate notch 23 is shown with the depending arm 22 of said member 16 located in said notch. Fig. 4 shows the arm 22 in the position it occupies when the drive lugs are in engagement, as shown in Fig. 2, while Fig. 5 shows said arm 22 in the position corresponding to the disengaged position of the drive lugs, as shown in Fig. 3.

The arm 22 is held in the position of Fig. 4 by a release trigger 25 pivoted on a pin 26 secured in the plate 10. A suitable torsion spring 27 is secured to the pivot pin 26 and bears against one arm of the trigger 25, thus tending to hold said trigger against the arm 22 in the position of Fig. 4.

One arm of the trigger 25 is provided with a set screw 28 which may be adjusted for a purpose presently to be described.

To rock the trigger 25 about its pivot pin 26 against the action of the spring 27, I provide a force-multiplying arcuate lever or trigger finger 30 pivoted on a post 31 on the plate 10, said lever having a nose 32 engaging one arm of the trigger 25. A stop pin 33 secured in the plate 10 limits outward movement of the lever 30.

It will now be seen that by adjustment of the set screw 28 with respect to the nose 32 of the lever 30, the degree of overlapping of the trigger 25 and the arm 22 of the holding member 16 may be varied. This is done for the purpose of causing disengagement of the drive lugs 8 and 13 in response to a predetermined but variable torque.

Actuation of the trigger finger or lever 30 to operate the trigger 25 so as to release the arm 22 is effected by an arm 35 secured to an auxiliary force-transmitting member 36, here shown in the form of a tube which surrounds the shaft 6 and is secured thereto by any suitable means such as screws 39.

Said arm 35 has an up-turned end 37 bearing against the trigger finger or lever 30 at one side of its pivot 31. Said up-turned end 37 may also be provided with a set screw 38 for adjusting the extent of movement of the lever 30 in response to varying degrees of torque.

By the arrangement thus far described, and particularly illustrated in Figs. 4 and 5, there is a power or work ratio of about 12:1 between the end of the trigger finger or lever 30 which contacts the set screw 38 and the nose 32 which contacts the set screw 28 in the trigger 25 of said trigger finger. This means that the said adjusting screws provide both a fine and a coarse adjustment. One of these adjustments may be made at the factory and the other may be made when the tool is put to work upon a particular job for which a predetermined power application or torque is required. This will enable an extremely accurate setting of the trigger 25 with respect to the arm 22 so that driving engagement may be instantly disrupted when the predetermined torque has been reached.

Referring again to Figs. 4 and 5, it will be seen that the trigger finger 30 is carried by the plate 10 which is firmly connected to the torque shaft 6. The auxiliary force-transmitting member or tube 36 is also firmly connected to the shaft 6. The arm 35 rests in contact with the end of the trigger finger 30. Now, when a predetermined resistance to the rotation of the shaft 6 is reached, the application of rotative power to the plate 10 tends to continue. Consequently, the movable trigger finger presses against the arm 35 with the result that said trigger finger rocks about its pivot 31. Such movement of the trigger finger rocks the trigger 25 about its pivot 26 so that the trigger clears the arm 22 on the holding member 16 which results in instant disconnection of the drive lugs 8 and driven lugs 13.

From the foregoing, it will be apparent that the arm 35 is part of an auxiliary force-transmitting member, here in the form of a tube 36. So long as the shaft 6 rotates without any substantial degree of resistance created by the work, said arm 35 continues to rotate with the shaft 6 and the plate 10. It is only when a predetermined resistance is reached, as determined by the accurate setting of the trigger 25 with respect to the arm 22 that the rocking of the trigger finger by forced engagement against the arm 35 results in the operation above described.

When the release of the holding member 16 occurs, continued rotation of the drive member 4 simply results in that its lugs 9 move the drive pawls 11 radially inwardly to the position shown in Fig. 3, in which said pawls are held against outward movement by the holding member 16.

It is to be noted that since the pawls 11 have been freed from the member 16, as above described, it requires practically no force whatever to move said pawls inwardly from the position of Fig. 2 to that of Fig. 3. The lugs 9 simply slide past the lugs 13. There is practically no friction involved and therefore practically no power expended for this purpose.

Disengagement of the drive lugs in the manner here described with practically no expenditure of power is to be distinguished from all prior art devices known to me in which the clutches disengage under full load. In such devices the constant movement of the clutch teeth or drive dogs past one another under full load results in the wearing of the clutch teeth to such an extent that the clutch members must be frequently replaced. Furthermore, in such prior art devices where the clutch teeth ride one upon the other under great load, there is a constant jarring of the apparatus as the teeth disengage, which jarring is transmitted to the operator and is of such serious nature as to result in undue and premature fatigue. Finally, in such structures, it is evident that there can be no instant release at any accurately predetermined resistance.

Furthermore, in most of the prior art devices known to me in which the clutch is disengaged under full load, said clutch is promptly reengaged and this is designed for the purpose of imparting to the work a series of rotative impacts in order to complete the setting of the fastener. Thus, the judgment of the operator is involved as to when he will remove the tool from the work. Experience shows that the number of rotative impacts imparted to the work depends largely upon the skill and attentiveness of the operator. If too many impacts are delivered, there may be stripping of threads or undesirable stress in the fastening member and associated parts; if too few impacts are delivered, the fastening member may not be properly seated. If the resistance of the work is too great, the socket of the tool may be worn or the corners of the head of the fastener may be worn off.

In my device as herein described, disruption of driving engagement is effected instantaneously by very light pressure and driving engagement cannot be re-established except by movement of the tool away from the work as presently to be described. It is here emphasized that immediately upon disengagement of the drive members, the torque shaft 6 is instantaneously disconnected from the driving member so that it becomes a dead spindle. Hence, there is no tendency to overdrive, with the resultant disadvantages above pointed out.

In order to re-establish driving connection between the drive lugs 8 and the driven lugs 13, the pawls 11 must be moved from the inactive position of Fig. 3 to the operative position of Fig. 2. This is accomplished by the following arrangement:

The outer end of the tube 36 is provided with a retainer ring 40 secured in an annular groove formed in said torque tube (see Fig. 1).

Between the tube 36 and the inner wall of the casing 1, I provide a bearing cup 41 housing a suitable bearing 42 supported on said retainer ring 40. Between the bearing cup and the casing 1, I provide a sleeve member 43 and a cooperating pin 44 for limiting outward movement of the torque shaft and tube assembly with respect to the casing 1.

I also provide a coil spring 45 which at its forward end engages the bearing cup 41 and at its inner end engages an abutment 46 suitably secured on the inside of the casing 1. By this arrangement, it will be apparent that it is the function of the spring 45 to press the torque shaft and tube assembly outwardly from the casing 1. When the tool is applied to the work, forward pressure results in the sliding movement of the tube and torque shaft assembly into the casing, such inward movement being limited by the contact of the inner end of the torque shaft 6 with the top of the chamber 5 formed in the driving member 4.

The purpose of the foregoing arrangement is to provide for the restoration to operative position of the driven pawls 11 (as shown in Fig. 2) after they have first been moved to the inactive position of Fig. 3. To this end I provide on the interior of the casing 1 a cam ring 50 so located that when the spring 45 is free to force the torque shaft assembly outwardly from the casing 1, the tail pieces 15 on the driven pawls 11 contact said cam ring 50 and are moved thereby about their pivots 12 from the position shown in Fig. 3 to the operative position shown in Fig. 2.

When this is done, the spring 17 operates to pivot the holding member 16 about the shaft 6 from the position shown in Fig. 3 to that shown in Fig. 2. Thereupon the trigger 25 will again engage the depending arm 22 of the said member 16 so that it will continue to hold the driven pawls in operative position until the mechanism is again set into operation by which said pawls are released.

It will be understood that when my invention is applied to a tool of the character here described it is desirable that the outward end 51 of the torque shaft 6 be made square or of other non-round configuration for the secure attachment thereto of the desired type of socket to be employed for the particular operation to be performed by the tool.

Figure 7:
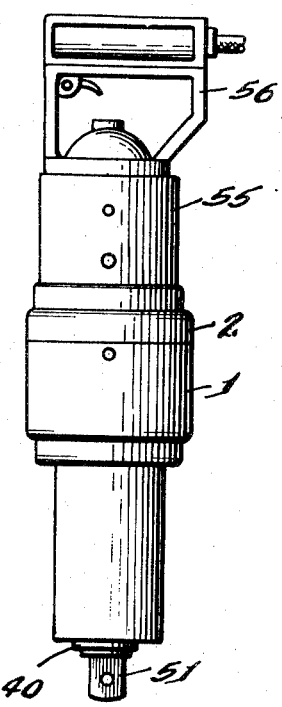
Fig. 7 is a side elevation, on a reduced scale, showing the application of my invention to the motor casing of a conventional electrically-operated nut wrench.
Figure 8:
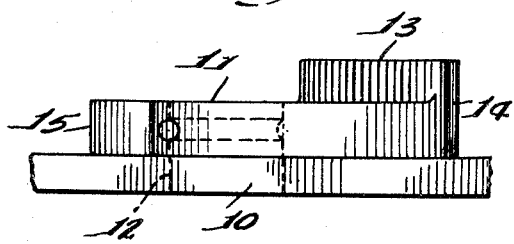
Fig. 8 is a view in side elevation of one of the pivotally mounted driven elements.

It will be understood by those skilled in the art that my torque applier as illustrated and described herein is useful for a great variety of purposes. When it is desired to use my invention in connection with power operated nut wrenches, screw drivers, and the like, my structure may be connected to any suitable source of power such as an electric motor (see Fig. 7). Ordinarily the housing of such motor will be provided with a handle 56 as a standard practice.

Whatever the source of power may be, it will be understood that my driving member 4 will be connected to such power source by any suitable means such as the usual gearing.

It will be readily understood by those skilled in the art that my invention is applicable to all sorts of devices in which torque is delivered for the purpose of instantly disrupting operation whenever desired, either because the work is finished, or for safety purposes to prevent the breakage of parts and for many other uses.

It will also be apparent that my device is capable of extremely accurate presetting of the point at which the drive will be disconnected and that such presetting will not be disrupted by the operation of the device as is true of the prior art devices operating in the manner heretofore described. That is to say, the adjustment is retained throughout the operation of the device and is not subject to shocks and jars as is true of earlier devices.

It is to be understood that while the member 4 and shaft 6 have been referred to herein respectively as drive and driven members, in some adaptations of the principles of my invention the functions of these parts may be interchanged. In other words, the power source may be connected to the end 51 to drive the member 4 and whatever mechanism is attached thereto.

Under such circumstances, release of the driving connection is accomplished by the use of a mere fraction of the total power load through relative movement between the shaft 6 and member 35—36 brought about by torsional distortion of the shaft 6 as governed by the magnitude of resistance to turning offered by the assembly being driven.

I claim as my invention:

1. A torque applier comprising a driving member, a driven member, elements on said members adapted to be brought into contact to establish driving connection between said members, torque responsive means connected to said driven member and adapted to move with respect thereto upon the application of a predetermined amount of torque, and means actuated by relative movement between said driven member and said torque responsive means for separating said elements to disrupt driving connection.

2. A torque applier comprising a driving member, a driven member, elements on said members adapted to be brought into contact to establish driving connection between said members, resistance-responsive means connected to said driven member and adapted to move with respect thereto upon the application of a predetermined amount of torque, means actuated by relative movement between said driven member and said resistance-responsive means for separating said elements to disrupt their driving connection, and means for varying the resistance by which said resistance-responsive means is actuated.

3. A torque applier comprising a driving member, a driven member, drive lugs on said driving member, drive lugs pivotally connected to said driven member and adapted to move in a plane transverse to the axis of rotation of said driven member, means holding said drive lugs in driving engagement, and means operated when the applier is delivering a predetermined torque for releasing said holding means, whereby said pivotally mounted drive lugs will be moved out of engagement with the drive lugs on said driving member by movement of the latter.

4. A torque applier comprising a driving member, a driven member, drive lugs on said driving member, drive lugs pivotally connected to said driven member and adapted to move in a plane transverse to the axis of rotation of said driven member, means holding said drive lugs in driving engagement, means operated when the applier is delivering a predetermined torque for releasing said holding means, whereby said pivotally mounted drive lugs will be moved out of engagement with the drive lugs on said driving member by movement of the latter, and means holding said pivotally mounted drive lugs out of engagement.

5. A torque applier comprising a driving member, a driven member, drive lugs on said driving member, drive lugs pivotally connected to said driven member and adapted to be moved into the path of travel of the drive lugs on said driving member to be driven thereby, means holding said pivotally mounted drive lugs in the path of travel of the lugs on said driving member, and means for releasing said holding means, said releasing means comprising a resistance-responsive member connected to said driven member and adapted to move with respect thereto when the applier is delivering a predetermined torque.

6. A torque applier comprising a driving member, a driven member, drive lugs on said driving member, drive lugs pivotally connected to said driven member and adapted to be moved into the path of travel of the drive lugs on said driving member to be driven thereby, means holding said pivotally mounted drive lugs in the path of travel of the lugs on said driving member, means for releasing said holding means, said releasing means comprising a resistance-responsive member connected to said driven member and adapted to move with respect thereto when the applier is delivering a predetermined torque, and means for holding said pivotally mounted lugs out of the path of travel of the lugs on said driving member.

7. A torque applier comprising a driving member, a driven member, drive lugs on said driving member, drive lugs pivotally connected to said driven member and adapted to be moved into the path of travel of the drive lugs on said driving member to be driven thereby, means holding said pivotally mounted drive lugs in the path of travel of the lugs on said driving member, means for releasing said holding means, said releasing means comprising a resistance-responsive member connected to said driven member and adapted to move with respect thereto when the applier is delivering a predetermined torque, means for holding said pivotally mounted lugs out of the path of travel of the lugs on said driving member, and means for releasing said holding means and moving said pivotally mounted pawls into the path of movement of the lugs on said driving member.

8. A torque applier comprising a driving member having drive lugs, a driven member, pivotally mounted drive lugs connected to said driven member, and adapted to be moved in a plane transverse to the axis of rotation of said driven member, means holding said pivotally mounted lugs in the path of travel of the lugs on said driving member, and means for releasing said holding means, said releasing means comprising a trigger mechanism, resistance-responsive means for operating said trigger mechanism to release said holding means when the applier is delivering a predetermined torque, whereby said pivotally mounted lugs are moved out of the path of the drive lugs on said driving member, and means for holding said lugs out of engagement.

9. A torque applier comprising a driving member provided with drive lugs, a torque shaft provided with pivotally mounted drive lugs adapted to be moved into the path of travel of the lugs on said driving member, means for holding said pivotally mounted lugs in driving engagement, a torque tube surrounding said torque shaft and rigidly connected thereto at one end, a movable connection between said torque tube and torque shaft at the other end, and means operated by relative movement between said torque tube and said torque shaft for releasing said holding means.

10. A torque applier comprising a driving member provided with drive lugs, a torque shaft provided with pivotally mounted drive lugs adapted to be moved into the path of travel of the lugs on said driving member, means for holding said pivotally mounted lugs in driving engagement, a torque tube surrounding said torque shaft and rigidly connected thereto at one end, a movable connection between said torque tube and torque shaft at the other end, means operated by relative movement between said torque tube and said torque shaft for releasing said holding means, and means for varying the extent of movement between said torque shaft and said torque tube to vary the resistance at which said holding means will be released.

11. A torque applier comprising rotatable driving and driven members, a driving assembly including rotatable clutch elements connecting said members in driving relating, means carried by one of said members and rotatable therewith at the same radial velocity during the application of torque until a predetermined resistance to rotation has been reached, a yielding engagement between said means and said driving assembly providing a differential in radial velocity between said means and said member when a predetermined resistance to rotation has been reached, means operated by said first means due to said differential in velocity for disconnecting said driving assembly, and means holding said driving assembly disconnected.

12. A torque applier comprising rotatable driving and driven members, a driving assembly including rotatable clutch elements connecting said members in driving relation, means carried by one of said members and rotatable therewith at the same radial velocity during the application of torque until a predetermined resistance to rotation has been reached, a yielding engagement between said means and said driving assembly providing a differential in radial velocity between said means and said member when a predetermined resistance to rotation has been reached, means operated by said first means due to said differential in velocity for disconnecting said driving assembly, means holding said driving assembly disconnected, and means for releasing said holding means and restoring said driving assembly to driving position.

13. A torque applier comprising a driving member, a driven member, drive lugs on said members adapted to be brought into engagement to establish driving connection between said members, certain of said drive lugs being movably connected to one of said members and adapted to be moved into the path of travel of the drive lugs on the other member, means holding said movably mounted drive lugs in the path of travel of said other lugs, means for releasing said holding means, said releasing means comprising a resistance-responsive member adapted to move said holding means to inoperative position when the applier is delivering a predetermined torque, whereby said movably mounted lugs are released for movement out of the path of said other lugs by continued rotation of said other lugs, means for holding said movably mounted lugs out of the path of movement of said other lugs, and means for releasing said last mentioned holding means and moving said movably mounted lugs back into the path of movement of said other lugs.

14. In a torque responsive mechanism for the application of driving force, work engaging means, a force transmitting assembly connected to said work engaging means including a disengageable drive mechanism having release means, a torque responsive device for transmitting driving force to the work engaging means and release means, said disengageable drive mechanism including certain drive means movable relatively to other drive means, said release means being adapted rigidly to hold said certain drive means in a position to drivingly engage said other drive means and to be actuated by said torque responsive device to release said certain drive means into disengaging position during continued application of the driving force when a predetermined torque is encountered by said work engaging means, means for translating said certain drive means and said other drive means away from one another, and means restoring said certain drive means while in said translated position to the drive position occupied before being released by said release means.

15. In a torque responsive mechanism for the application of driving force, work engaging means, a force transmitting assembly connected to said work engaging means including a disengageable drive mechanism having release means, a torque responsive device for transmitting driving force to the work engaging means, an auxiliary force transmitting means actuable by torque responsive action of said torque responsive means and release means, said disengageable drive mechanism including certain drive means movable relatively to other drive means, said release means being adapted rigidly to hold said certain drive means in a position to drivingly engage said other drive means and to be actuated by said auxiliary force transmitting means under the influence of said torque responsive device to release said certain drive means into disengaging position during continued application of the driving force when a predetermined torque is encountered by said work engaging means, means for translating said certain drive means and said other drive means away from one another, and means restoring said certain drive means while in said translated position to the drive position occupied before being released by said release means.

16. In a torque responsive mechanism for the application of driving force, work engaging means, a force transmitting assembly connected to said work engaging means including a disengageable drive mechanism having certain drive means movable relative to other drive means for drive engagement therewith and for disengagement therefrom, a torque responsive device for transmitting driving force to said work engaging means and actuable through a torque responsive movement superimposed upon the driving force transmitting movement when said work engaging means encounters a predetermined torque, auxiliary force transmitting means relatively operable with respect to said torque responsive device in accordance with said superimposed movement, releasable means for rigidly holding said certain drive means in drive engagement with said other drive means and actuable by said auxiliary force transmitting means to release said certain drive means from drive engagement with said other drive means during continued application of the driving force, means, for translating said certain drive means and said other drive means away from one another, and means for restoring said certain drive means while in said translated position to the drive position occupied before being released by said release means.

17. In a torque responsive mechanism for a power driven assembly, a driving member, work engaging means, a force transmitting connecting assembly between said driving member and said work engaging means including a disengageable drive mechanism and a torque responsive device, said drive mechanism including certain drive means movable relatively to other drive means, release means for holding said certain drive means in a position to drivingly engage said other drive means, said release means being adapted to be actuated by said torque responsive device to release said certain drive means into a disengaging position during continued operation of the source of power when a predetermined torque is encountered by said work engaging means, means for translating said certain drive means away from said other drive means, and means restoring said certain drive means while in said translated position to the drive position occupied before being released by said release means.

18. A torque applier comprising a driving member, a driven member, an auxiliary force transmitting member, a driving assembly connecting said members in force transmitting relation, a release means for said assembly, said assembly including means dividing the transmitted force of said driving member into two components one of which is greater than the other, said greater component being transmitted by said assembly to said driven member, the smaller component being transmitted by said assembly to said auxiliary force transmitting member, means operated by said auxiliary force transmitting member to actuate said release means by said smaller force component when the resistance to the greater force component reaches a predetermined degree, means holding said driving assembly disconnected, and means for releasing said last-mentioned holding means and reconnecting said driving assembly.

19. In a torque responsive mechanism for the application of driving force, work engaging means, a force transmitting assembly connected to said work engaging means including a disengageable drive mechanism having release means, a torque responsive device for transmitting driving force to the work engaging means and release means, said disengageable drive mechanism including certain drive means movable relatively to other drive means, said release means being adapted rigidly to hold said certain drive means in a position to drivingly engage said other drive means and to be actuated by said torque responsive device to release said certain drive means for disengaging movement during continued application of the driving force when a predetermined torque is encountered by said work engaging means, means for rendering said drive means further inoperative relative to each other, and means restoring said drive means, while so rendered inoperative to the drive position occupied before being released by said release means.

PAUL A. STURTEVANT.

REFERENCES CITED

The following references are of record in the file of this patent:

UNITED STATES PATENTS

| Number | Name | Date |
| --- | --- | --- |
| 1,548,427 | Aldeen | Aug. 4, 1925 |
| 1,715,909 | Marchen | May 21, 1929 |
| 2,061,843 | Meunier | Nov. 24, 1936 |